United States Patent [19]

Burkwall, Jr.

[11] 4,127,678

[45] * Nov. 28, 1978

[54] CASEINATE REPLACEMENT IN SEMI-MOIST PET FOODS

[75] Inventor: Morris P. Burkwall, Jr., Marengo, Ill.

[73] Assignee: The Quaker Oats Company, Chicago, Ill.

[*] Notice: The portion of the term of this patent subsequent to Aug. 23, 1994, has been disclaimed.

[21] Appl. No.: 777,166

[22] Filed: Mar. 14, 1977

Related U.S. Application Data

[63] Continuation-in-part of Ser. No. 706,534, Jul. 19, 1976, abandoned, and Ser. No. 706,536, Jul. 19, 1976, Pat. No. 4,044,158, said Ser. No. 706,534, is a continuation-in-part of Ser. No. 598,415, Jul. 23, 1975, abandoned, said Ser. No. 706,536, is a continuation-in-part of said Ser. No. 598,415.

[51] Int. Cl.² .............................................. A23L 1/31
[52] U.S. Cl. .................................... 426/250; 426/271; 426/332; 426/331; 426/805
[58] Field of Search ............... 426/271, 805, 331, 332, 426/250, 630

[56] References Cited

U.S. PATENT DOCUMENTS

| | | | |
|---|---|---|---|
| 3,615,652 | 10/1971 | Burgess et al. | 426/805 |
| 3,653,908 | 4/1972 | Buck | 426/332 |
| 3,745,021 | 7/1973 | Middlesworth | 426/805 |
| 3,769,034 | 10/1973 | Dreier, Jr. | 426/271 |
| 4,044,158 | 8/1977 | Burkwall | 426/331 |

*Primary Examiner*—Jeanette M. Hunter
*Attorney, Agent, or Firm*—Mathew R. P. Perrone, Jr.

[57] ABSTRACT

A semi-moist pet food having the appearance and texture of meat, which formerly required sodium caseinate to achieve the meat-like texture and appearance after processing, now includes a pregelatinized or modified amylaceous material, a non-caseinate protein source, and a substantially neutral chelating agent in a combination to replace at least part of the casein salt in the semi-moist pet food to still achieve the meat-like texture and appearance after processing.

18 Claims, No Drawings

CASEINATE REPLACEMENT IN SEMI-MOIST PET FOODS

CROSS-REFERENCE TO RELATED APPLICATIONS

This application is a continuation-in-part of U.S. patent applications Ser. Nos. 706,534 (now abandoned) and 706,536 (now U.S. Pat. No. 4,044,158 to Burkwall) both filed July 19, 1976, which in turn are continuations-in-part of U.S. Patent application Ser. No. 598,415 filed July 23, 1975, now abandoned.

BACKGROUND OF THE INVENTION

This invention relates to a food and more particularly to a meat-like textured pet food having at least part of the casein salt replaced with a composition comprising a pregelatinized or modified amylaceous material, a non-caseinate protein source, and a substantially neutral chelating agent.

Within the class of foods known as pet foods, there are three basic subdivisions: (1) dry pet food containing up to 15 percent moisture, (2) semi-moist pet food usually containing about 15 percent to 50 percent moisture, and (3) moist pet foods containing above 50 percent moisture. The moisture is determined by considering both the water present in the final product and the water combined with the various components that make up the final product. In general, the dry pet food tends to be the most stable and requires no special handling or packaging upon distribution. The semi-moist pet food tends to be less stable than the dry pet food and requires essentially a moisture impermeable packaging system. However, the semi-moist pet food requires no refrigerated storage, and is microbiologically stable due to the presence of various stabilizing agents. The moist pet food requires stringent canning sterilization conditions. In fact, the moist pet food is canned and sterilized by retorting in the usual manner. When the can is opened, the pet food not consumed must be refrigerated to preserve it even for a short period of time. Thus, it may be seen that the dry and semi-moist pet foods are the most stable pet foods; whereas the moist is of lowest stability after the respective packages are opened. When considering palatability, generally speaking the moist pet food tends to be the most palatable and the semi-moist pet food falls somewhere in between the mosit and the dry pet food as to palatability. It follows that both as to palatability and stability the semi-moist pet food ranks in between the dry and the moist pet food. This ranking permits the semi-moist pet food to provide both shelf stability and palatability. In other words, a pet owner using a semi-moist pet food has fewer problems storing a pet food which his pet will eat. The advantages of a semi-moist pet food thus become obvious.

In semi-moist pet foods and other processed foods, casein salts such as sodium caseinate provide a highly suitable material to use as a base for a semi-moist food. This material is considered to have thermo-plastic properties and adhesive like properties and is thus both a good binder and a good extrudable material. Furthermore, this material is such a high quality protein, that it is used as a standard for determining or measuring protein quality of other protein-containing materials. It also has a high protein content, usually containing in excess of 90 percent protein. So, in addition to the processing advantages of using sodium caseinate, there is also a nutritional advantage due to the protein provided thereby. It thus becomes obvious why this material is so widely used in the food processing art and especially in the pet food art. However, the price of casein salts such as sodium caseinate is very high due to the economic conditions associated with milk processing. This price is so high, that it is not economically feasible to use high levels of caseinate in pet foods. It foods that it is desirable to develop a replacement for at least some of the caseinate in order to reduce product cost.

The unique qualities of casein salts such as for example sodium, calcium, magnesium, ammonium, and potassium caseinate render them difficult to replace. Not only must the replacement provide protein and processability, the appearance and flavor of the product must be substantially maintained. Thus it follows that the replacement for this component must also be readily processable in for the product in order to avoid substantial changes in machinery and manufacturing equipment. Also, the protein level of the replacement must remain high and the palatability of the product containing the replacement must remain substantially the same.

The most successful pet foods have the appearance and texture of meat while not actually using the expensive cuts of meat. An example of a marbled meat pet food is found in either U.S. Pat. No. 3,380,382 to Bone or U.S. Pat. No. 3,765,902 to Charter. Both of the cited patents are incorporated herein by reference. Each of the cited patents discloses a marbled meat pet food that is highly successful on the market and has a proven nutritional value for pets. A typical marbled meat product of the Bone patent contains 30 to 70 percent meat or meat by-products, 7.5 to 25 percent sodium caseinate, 15 to 30 percent sugar, 2 to 10 percent propylene glycol, 0.5 to 10 percent regular corn starch and appropriate color modifying agents. The key ingredient in this composition is the sodium caseinate, which acts as an adhesive by providing stickiness, as a binder, as a source of viscosity control, as a high quality protein source, and as a bland palatable protein source.

Thus it can be seen that to replace all of the functions of casein salts will be difficult.

SUMMARY OF THE INVENTION

Therefore, it is an object of this invention to provide an improved pet food of the semi-moist category.

It is a further object of this invention to provide a palatable, semi-moist pet food.

It is still a further object of this invention to provide an improved pet food having the casein salt therein at least partially replaced with an equivalent protein binder system.

It is also an object of this invention to provide an improved pet food having a high nutritional quality.

These and other objects of the invention are accomplished by replacing at least part of the casein salt binder in a pet food with a composition comprising a noncaseinate protein source, a pregelatinized or modified amylaceous material, and a substantially neutral chelating agent.

DESCRIPTION OF THE PREFERRED EMBODIMENTS

A semi-moist meat type pet food is provided by replacing a part of sodium caseinate or other casein salts in the meat type pet food with a composition including a non-caseinate protein source, a pregelatinized or modified amylaceous material, and a substantially neutral chelating agent.

The composition of this invention is suitable for use in any type of semi-moist pet food. This composition is suitable for use in a single color pet food or a multicolor pet food. Color is merely a matter of choice, which is adjusted by adding various edible coloring agents to the pet food. Such coloring agents are well known in the art. Furthermore, amounts of coloring agents are easily determined. In this manner pet foods having one or more colors are made and blended.

As discussed previously, the Bone and Charter patents describe a process to produce a solid, semi-moist, marbled, meat-like pet food. The marbled, meat-like pet food is a multi-colored pet food. The product produced by the method disclosed therein is highly acceptable as a pet food. The above-mentioned patents are incorporated herein by reference because the method and product disclosed therein are substantially the same as the method and product disclosed in this application. The major improvement of this application over the cited patents and over other semi-moist pet foods is the replacement of the casein salt in whole or in part, with a more readily available and lower cost binder system which approaches or equals or exceeds the acceptability of the product using the casein salt. Since the casein salt has many functions, it is necessary to use a multi-component system that, when added in place of the casein salt, will essentially duplicate all of its functions. The following describes more fully the multicomponent binder system and how each portion interacts with the other and with the base ingredients to give a product that essentially duplicates the Bone and Charter products, without using the heretofore required caseinate.

As above-indicated, the critical ingredients for replacing the casein salt binder of Bone includes a combination of pregelatinized or modified amylaceous material, a protein source and a substantially neutral chelating agent.

The Bone and Charter processes produce a product which normally uses 0.5–10% of a regular starch or more specifically regular corn starch. The caseinate replacement composition of this invention requires a pregelatinized or modified amylaceous material. This material is thought to contribute to the water binding properties that a casein salt replacement system must contribute to the overall dough and final product characteristics. Any pregelatinized or modified amylaceous ingredient which serves as water binder for a water containing pet food dough is suitable for use therein. However pregelatinized flours, or pregelatinized starches, are most suitable as the water binder because of their availability, water binding effectiveness, and contributions to process handling. Typical water binders include at least one of the group consisting of pregelatinized tapioca starch, pregelatinized modified corn starch, pregelatinized corn meal, and pregelatinized wheat flour. The preferred water binder is pregelatinized wheat flour. This flour is the most effective because it maximizes the desired characteristics of a water binder and has a positive contribution to finished product texture. Also modified starches whether they be chemically modified or physically modified by such methods as oxidation and partial hydrolysis may be used. The water binder is generally present in the product as part of the casein salt binder replacement system in about 2 to about 20 percent by weight of the product. More preferably, the amount of water binder is about 3 to about 15 percent by weight. Most preferably, the amount of water binder is about 3 to about 10 percent by weight because of its processing and texture characteristics. It is important to emphasize that this pregelatinized starch or modified amylaceous material is added to the product in addition to the regular corn starch normally used by Bone and not as a partial replacement for the regular corn starch.

As sodium caseinate is removed, it is required to compensate for the protein lost by casein salt removal in whole or in part by adding at least one protein source. This protein source added is generally a non-caseinate based protein such as vegetable protein or animal protein. The protein source may be a functional protein that can absorb moisture or contribute to viscosity, or the protein may be a substantially non-functional source in that it does not substantially absorb moisture or contribute to viscosity, or it can be mixtures thereof.

Typical functional proteins are the oilseed proteins and the proteins isolated from cereal grains such as wheat gluten. Typical oil seed proteins include soy bean, rapeseed, peanut, and cottonseed. These particular oil seeds are suitable for use in the pet food either as a meal, a concentrate, an isolate, or a flour. Especially suitable for use to replace or provide the protein content for the casein salt replacement is soy flour, soy protein concentrate, soy protein isolate or mixtures thereof. These vegetable proteins are especially suitable because of their high nutritional quality, favorable availability as opposed to casein salts and its contribution to dough viscosity and cohesiveness and extrudate stickiness and texture.

Typical proteins, which do not readily absorb mositure or contribute to viscosity include corn germ, corn germ meal, corn distillers dried grains, dried corn distillers solubles, meat and bone meal, other meat by-product meals, wheat germ and wheat germ meal. Other protein sources, such as yeast, dried whey and similar ingredients may be used to provide protein lost by caseinate removal.

In all cases, the amount of protein contributed by the casein salt is replaced on a dry protein basis in roughly a 1:1 ratio by the non-caseinate protein sources described above. In general, it is preferred to have at least one-half of the protein source be a functional vegetable protein which can readily absorb moisture and contribute to viscosity.

Since the Bone patent specifies from 7.5 to 25 percent sodium caseinate, it is required that the amount of casein salt is replaced such that the product contains from 0 to 7.5 percent sodium caseinate in the final product. Thus, about 0.1 to about 30 percent by weight vegetable protein based on the weight of the pet food is suitable for use in the casein salt replacement, however more preferred is the 3–22 percent range. Most preferred is about 4 to about 20 percent vegetable protein because of the substantial advantages incurred when the casein salts are replaced on a protein basis with functional vegetable protein sources.

The final component required for the casein salt replacement binder system is a substantially neutral chelating agent in combination with the protein source and the pregelatinized or chemically modified starch source. The preferred substantially neutral chelating agents are generally the salts of suitable "acid" chelating agents such as phosphoric acid and their polymers, citric acid, acetic acid, gluconic acid, tartaric acid, and phytic acid. Of these, phosphoric acid components which are suitable for use in chelating agents, the phosphate, the hexametaphosphate, the tetrapyrophosphate, pyrophosphate, polyphosphate, diphosphate, and orthophosphate versions are suitable. Salts of these various phosphate components which are suitable include the sodium salt, calcium salt, the potassium salt, and the aluminum salt. The referenced ions can be mono, di, tri, or mixtures thereof with the various phosphate compounds. The citric acid salts suitable for use in this invention include the sodium, the potassium, the calcium, the monoglyceride, the monisopropyl, the stearyl, and the triethyl salts of citric acid. Again, the various types of citric acid salt can be mixed either within the molecule or by using separate molecules of the same salt. With regard to the acetates, the mono, or the diacetate is suitable. Further, the ethylenediaminetetraacetates are also suitable. Again, calcium, potassium, sodium, are suitable salts for use to form an appropriate version of the salt. For the gluconate, tartrate, and phytate, the sodium, calcium, and potassium salts are also suitable. Other suitable substantially neutral chelating agents for use herein are listed in the *Handbook of Food Additives* published by CRC Press, Cleveland, Ohio, copyright 1972 (Library of Congress Catalog Card Number 68-21741).

Generally speaking, a substantially neutral pH is required for caseinate salts and their replacement system to function properly during extrusion. The isoelectric point of casein protein is around 4.6. As this pH is approached, sodium caseinate becomes less and less functional even to the point of becoming an insoluble non-functional curd called casein which does not have the desirable properties for use in a semi-moist pet food. This feature is also required for the caseinate replacement of this invention. Specifically, the caseinate replacement composition for this invention operates in a substantially neutral pH. By "substantially neutral" is meant that the pH range for the pet food covers the field of about 6.1 to 8.0. More preferably, the pH range is 6.2 to 7.5. Substantially improved results are obtained which lead to the conclusion that the most preferred range is 6.3 to 7.2. This pH range is customarily obtained naturally in these particular pet food compositions, but is adjustable with edible acids or bases.

While the above-reference pH range is critical for the purposes of formulating this pet food, it is nevertheless possible to use chelating agents that are acidic in nature especially if they are used in such amounts that they can not reduce the pH below about pH 6.1. Also acid type chelators can be used if they are added and neutralized prior to the processing step. There are a number of foodgrade basic components or foodgrade chelator salts that are basic in nature, which raise the pH to the desired range — or otherwise effectively neutralize the pet food — in spite of the use of acid chelator. Typical foodgrade basic components include sodium bicarbonate, calcium carbonate, di- and tri-sodium phosphates, di- and tri-potassium phosphates, di- and tri-calcium phosphates alkaline sodium aluminum phosphate and mixtures thereof. Typical foodgrade chelator salts which are basic in nature include tetrasodium pyrophosphate, potassium tripolyphosphate or mixtures thereof. Typical acid chelators are represented by citric acid, fumaric acid, lactic acid, oxalic acid, malic acid, aspartic acid, adipic acid, ethylenediaminetetraacetic acid, phosphoric acid, tartaric acid, chelating salts which are acidic in nature and mixtures thereof. When the acid chelator is rendered substantially neutral by the referenced edible basic salt or the basic chelator salt, the acidic chelator in combination with vegetable protein and pregelatinized or chemically modified starch replaces part or all of the caseinate derivative in the pet food. Of course, if the acid chelator is used only in amounts sufficient to adjust the pH range to about 6.1 to about 8.0, then no baic salt need be used.

Generally speaking, at least 0.01 percent by weight of the pet food is chelating agent. More preferably, the chelating agent comprises about 0.01 percent to about 2 percent by weight of the pet food. More preferably, the sodium caseinate replacement comprises about 0.1 to about 1 percent by weight. The best results are obtained with about 0.2 to about 1 percent by weight chelating agent in the pet food.

As has been described, the casein salt is replaced with an equivalent amount of protein plus a specified amount of pregelatinized or modified amylaceous material and a substantially neutral chelating agent. If it is necessary for the weight of casein salt replacement system to exceed the weight of casein replaced, this is easily accomplished by reducing the amount of other non-functional ingredients in the pet food. In order to add these components which function to replace the sodium caseinate to the product, it is generally preferred that one or more non-functional ingredients be reduced in an amount equivalent to the amount of functional ingredients added. Generally one skilled in the art will be able to adjust the formulation accordingly. For example two ingredients that can be reduced slightly are the sugar and the meat and meat by-products. Both can contribute to palatability but both do not significantly contribute to the texture and appearance of the product. Thus the amount that can be removed from the formulation is carefully controlled in order to maximize both the palatability as well as the structural texture of the product.

In addition to the caseinate difference, the product of this invention also differs in other ways from the Bone and Charter products. While Bone requires the product of his invention to have 30–70 percent meat, and the product of this invention may also use that level of meat, the animal food of this invention is also operable with about 5 percent to about 50 percent by weight meat by-products or meat. By "meat" is meant the flesh of cattle, swine, sheep, goats, horses, whale, and other mammals, poultry and fish. The term "meat by-products" includes such constituents as are embraced by that term in the Official Publication, 1976, published by the Association of American Feed Control Officials, Inc., pages 77–79 incorporated herein by reference. Hereafter the term "meat" includes both meat and meat by-products.

Various types of meat can be mixed to form the meat portion of this animal food. Various mixtures of meat adjust the flavor of the animal food. An acceptable range of meat for this animal food includes 10 to 40 percent. The preferred range of meat for this product is from about 15 percent to about 35 percent by weight of the total product. The preferred meat by-products vary in color according to the desired product color but include beef tripe, beef intestines, partially defatted beef tissue, partially defatted pork tissue, and other light color by-products; and also beef liver, pork liver, beef lungs, pork lungs, and other red meat by-products. Mixtures of meat and meat by-products are also usable. Meat and bone meal is also usable for protein.

The moisture content of this product is about 15 percent to about 50 percent by weight, or more preferably 20 percent to 40 percent. The moisture is provided in any suitable fashion — either by components of the product, by addition of water to the product or by combinations thereof. For example, the meat or meat by-products contain a substantial amount of moisture and provide a portion or all of the moisture suitable when used in the product. Water alone can also be used to provide the moisture content of the product in whole or in part.

Sugar is also another component of this particular pet food. Typical sugars used are sucrose and corn syrup. By "sugar" is meant any edible sugar used in the food art. Substantial examples of suitable sugars for use in the food art are listed in U.S. Pat. No. 3,202,514 to Burgess, et al. incorporated herein by reference. Bone required 15-30 percent sugar to produce his product. We have found that lower amounts can also be utilized. A suitable amount of sugar for use in this product ranges from about 1 percent by weight to about 35 percent by weight of the final product. The preferred range of sugar for use in the composition ranges from 5 percent by weight. The sugars are used singly or in any reasonable combination. The primary purpose of the sugars is to contribute to palatability because the sugars do not contribute significantly to shelf microbiological stability or finished product functionality.

For flavor and nutritional purposes a variety of salts may be added to this pet food. Typical salts suitable for use in this invention include iodized salt, regular salt, potassium chloride, and other suitable edible salts. Vitamins, minerals, colorings, flavorants and antioxidants flavors are generally present in the pet food in the sufficient amount (generally about 0 to about 7 percent) to provide nutrition and to add to overall appearance.

Various other common additives from 0 to about 25 percent may also be added to the semi-moist pet food. Fat is usually added in an amount from 0 to about 12 percent by weight of the final product depending on how much fat is naturally contained in the meat or meat by-products used. The fat may be of either animal or vegetable origin. A preferred fat for use in this pet food is an animal fat exemplified by prime steam lard, tallow, and choice white grease.

The microbiological stabilizer system for the semi-moist pet food of this invention comprises at least one polyhydric alcohol, and at least one antimycotic. The sugar as above defined also contributes to the stability of the pet food by lowering the water activity. The antimycotic is generally an edible antimicrobial acid or acid salt present in the pet food in an amount of less than or equal to 1 percent by weight of the pet food. Typical edible acids and their salts suitable for antimycotic use include benzoic acid, the benzoate salts, the paraben salts, propionic acid, and the propionate salts, acetic acid and the acetic salts, sorbic acid and the sorbate salts. An especially preferred antimycotic is potassium sorbate. A typical polyhydric alcohol component suitable for use in this invention is disclosed in U.S. Pat. No. 3,759,714 to Burkwall above-referenced. Preferable polyhydric alcohols are propylene glycol and 1,3-butanediol used individually or in combination. From about 2 to 10 percent of the polyhydric alcohol in combination with the anti-mycotic and sugar is used to stabilize the product by preventing microbiological growth.

The sodium caseinate replacement system is applicable to any suitable semi-moist pet food. Such pet foods are well known in the art. This contribution for sodium caseinate replacement or casein salt replacement is suitable for use with all types of semi-moist pet foods and various limitations are not effective to change the value of this caseinate replacement. However, this replacement has been found especially suitable for use in pet foods such as those described in the Bone and Charter patents above-referenced.

Once the ingredients are assembled for making the semi-moist pet food, any suitable process for making semi-moist pet food is usable. A preferable process is an extrusion process. If a multi-color pet food is desired, the extrusion sheeting process as set forth in Charter, above-cited is used.

In the following Examples submitted to illustrate, but not unduly limit the invention, all parts and percentages are by weight unless otherwise specified.

EXAMPLE I

The following table listed three different formulations. Formulation A is control using all sodium caseinate as the protein source. Formula B replaces approximately one-half of te sodium caseinate with soy protein isolate, an appropriate amylaceous ingredient system, and a chelating agent. Formula C replaces all of the sodium caseinate with soy protein isolate an appropriate amylaceous ingredient system, and a chelating agent.

| Ingredient | Formula A | Formula B | Formula C |
| --- | --- | --- | --- |
| Meat by-products | 30.0 | 30.0 | 30.0 |
| Sugar | 25.0 | 23.0 | 21.0 |
| Corn Starch | 8.0 | 6.0 | 6..0 |
| Propylene Glycol | 5.0 | 5.0 | 5.0 |
| Potassium Sorbate | 0.1 | 0.1 | 0.1 |
| Animal Fat | 4.0 | 4.0 | 4.0 |
| Vitamins, Minerals, Coloring Salts, Antioxidants, etc. | 8.0 | 8.0 | 8.0 |
| Water | 7.4 | 7.0 | 7.0 |
| Sodium Caseinate | 12.5 | 6.5 | 0 |
| *Caseinate Replacement System | | | |
| *Soy Protein Isolate | — | 6.0 | 12.5 |
| *Modified Corn Starch | — | 2.0 | 4.0 |
| *Pregelatinized Wheat Flour | — | 2.0 | 2.0 |
| *Tetra-Sodium Pyrophosphate | — | 0.4 | 0.4 |
| | 100.0 | 100.0 | 100.0 |

Each of these examples used red color and is processed as in the Charter patent above-referenced except that they are not marbled with a white portion. Product B and C are equivalent to Product A in dough consistency, extruder processability, and final product texture and appearance. All three products have a pH in the range of 6.6-7.0.

EXAMPLE II

Formula C in Example I is used except that the chelating agent, tetra-sodium pyrophosphate, is removed from the formulation. The product is processed as in the above-referenced Charter patent. The dough consistency of this example is equivalent to that of Example I. However, extruder processability and the final product texture and appearance are poor and not acceptable. This illustrates the importance of using a small amount of chelator in combination with a protein source and a modified corn starch and pregelatinized wheat flour to obtain a satisfactory caseinate replacement system.

| Ingredient | Formula A | Formula B |
| --- | --- | --- |
| Meat By-products | 30.0 | 30.0 |
| Sugar | 18.0 | 18.0 |
| Corn Starch | 7.0 | 7.0 |
| Propylene glycol | 6.9 | 6.9 |
| Potassium Sorbate | 0.1 | 0.1 |
| Animal fat | 2.0 | 2.0 |
| Vitamins, Minerals, | | |

-continued

| Ingredient | Formula A | Formula B |
| --- | --- | --- |
| Coloring, Salts, antioxident | 6.5 | 6.5 |
| Water | 6.5 | 8.5 |
| Sodium caseinate | 6.0 | 6.0 |
| *Caseinate Replacement System | | |
| *Soy protein concentrate | 9.0 | 9.0 |
| *Pregelatinized Wheat flour | 3.0 | 3.0 |
| *Citric acid | 2.0 | 2.0 |
| **Sodium bicarbonate | 2.0 | — |
| | 100.0 | 100.0 |

**used to neutralize the acid pH contributed by citric acid.

Formulation A has a pH of 6.6 and forms a cohesive non-sticky dough similar to Formula A. Formulation B has a pH of 4.76 and gives a very sticky non-acceptable dough. Formulation A extrudes well and forms an acceptable product. Product B, however, is very difficult to extrude and produces an unacceptable textured product, showing that the substantially neutral pH is required to make a suitable pet food.

Obviously, modifications of this invention are possible. It is understood, therefore, that this application is intended to cover any variations, uses, or adaptations of the invention as may be considered to be known or customary practice in the the art to which this invention pertains.

Having fully described and disclosed the invention, what is claimed and desired to be secured by Letters Patent of the United States is:

1. In a semi-moist pet food comprising:
   I. about 30 to about 70 percent of meat or meat by-products;
   II. about 15 to about 30 percent sugar;
   III. about 2 to about 10 percent polyhydric alcohol;
   IV. about 0.5 to about 10 percent regular corn starch;
   V. a sufficient amount of nutritional supplements, flavor, and color ingredients; and
   VI. about 7.5 to about 25 percent casein salt — the improvement wherein the casein salt is replaced by a composition comprising:
      (a) a sufficient amount of a vegatable protein source to replace the protein contributed by casein salt on approximately a weight for weight basis;
      (b) about 2 to about 20 percent by weight pregelatinized or modified amylaceous ingredients;
      (c) about 0.01 to 2 percent by weight of a chelator system comprising an acid chelator and a sufficient amount of an edible base to adjust the pH of the food to a pH in the range of about 6.1 to about 8.0 and wherein the casein salt component of the pet food is reduced to less than 7.5 percent
   — all percentages herein being based on the weight of the pet food.

2. The semi-moist pet food of claim 1 wherein the pregelatinized amylaceous ingredient is pregelatinized wheat flour.

3. The semi-moist pet food of claim 1 wherein the chelator is at least one selected from the group consisting of fumaric acid, lactic acid, oxalic acid, citric acid, malic acid, aspartic acid, adipic acid, ethylenediaminetetraacetic acid, phosphoric acid, tartaric acid, chelating salts acidic in nature, and mixtures thereof, and is neutralized sufficiently to adjust the pH of the pet food to a range of 6.1 to 8.0.

4. The pet food of claim 3 wherein the acidic chelator is neutralized by at least one food grade base selected from the group consisting of sodium bicarbonate, calcium carbonate, disodium phosphate, trisodium phosphate, dipotassium phosphate, tripotassium phosphate, dicalcium phosphate, tricalcium phosphate, sodium aluminum phosphate and mixtures thereof.

5. The semi-moist pet food of claim 1 wherein the chelator system comprises tetrasodium pyrophosphate.

6. The semi-moist pet food of claim 1 wherein the casein salt comprises 0 percent by weight of the pet food.

7. The semi-moist pet food of claim 1 wherein the vegetable protein is at least one selected from the group consisting of soybean, cottonseed, and peanut; and wherein the vegetable protein is used in at least one form selected from the group consisting of meal, concentrate, isolate, and flour.

8. The semi-moist pet food of claim 1 wherein the chelator system further comprises at least one substantially neutral chelating agent.

9. The semi-moist pet food of claim 8 wherein the substantially neutral chelating agent is at least one phosphate salt selected from the group consisting of a phosphate, a hexametaphosphate, a tetrapyrophosphate, a pyrophosphate, a polyphosphate, a diphosphate, and an orthophosphate.

10. The semi-moist pet food of claim 9 wherein the phosphate salt is at least one salt selected from the group consisting of the sodium salt, the calcium salt, the potassium salt, and the aluminum salt.

11. The semi-moist pet food of claim 1 wherein the chelator system is a neutral chelating agent selected from the group consisting of a citric acid salt, an acetic acid salt, a gluconic acid salt, a tartaric acid salt, and phytic acid salt, and mixtures thereof.

12. The semi-moist pet food of claim 11 wherein the citric acid salt is selected from the group consisting of the sodium salt, the potassium salt, the calcium salt, the monoglyceride salt, the monoispropyl salt, the stearyl salt, the triethyl salt, and mixtures thereof.

13. The semi-moist pet food of claim 11 wherein the gluconic acid salt, the tartaric acid salt, and the phytic acid salt, is at least one selected from the group consisting of the sodium salt, the calcium salt, and the potassium salt.

14. The semi-moist pet food of claim 8 wherein the neutral chelating agent is at least one selected from the group consisting of a monoacetate, a diacetate, or mixtures thereof.

15. The semi-moist pet food of claim 14 wherein the monoacetate or diacetate is selected from the group consisting of the calcium acetate, the potassium acetate, the sodium acetate, and mixtures thereof.

16. The semi-moist pet food of claim 8 wherein the neutral chelating agent is an ethylenediaminetetraacetate salt.

17. The semi-moist pet food of claim 16 wherein the ethylenediaminetetraacetate salt is at least one selected from the group consisting of sodium salt, a potassium salt, a calcium salt, and mixtures thereof.

18. The semi-moist pet food of claim 6 wherein the acid chelator is at least one selected from the group consisting of fumaric acid, lactic acid, oxalic acid, citric acid, malic acid, aspartic acid, adipic acid, ethylenediaminetetraacetic acid, phosphoric acid, tartaric acid, chelating salts acidic in nature, and mixtures thereof, and is added in an amount sufficient to adjust the pH of the pet food to a range of 6.1 to 8.0.

* * * * *